(12) United States Patent
Stephens

(10) Patent No.: US 11,307,575 B2
(45) Date of Patent: *Apr. 19, 2022

(54) AUTONOMOUS GROUND ATTACK SYSTEM

(71) Applicant: The Boeing Company, Chicago, IL (US)

(72) Inventor: Gentry B. Stephens, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,138

(22) Filed: Apr. 16, 2019

(65) Prior Publication Data

US 2020/0333783 A1 Oct. 22, 2020

(51) Int. Cl.
  *G05D 1/00* (2006.01)
  *B64C 39/02* (2006.01)
  *F42B 23/10* (2006.01)

(52) U.S. Cl.
  CPC ......... *G05D 1/0038* (2013.01); *B64C 39/024* (2013.01); *F42B 23/10* (2013.01); *G05D 1/0088* (2013.01); *B64C 2201/12* (2013.01); *B64C 2201/146* (2013.01); *G05D 2201/0209* (2013.01)

(58) Field of Classification Search
  CPC ............... G05D 1/0038; G05D 1/0088; G05D 2201/0209; B64C 39/024; F42B 23/10
  See application file for complete search history.

(56) References Cited

U.S. PATENT DOCUMENTS

| | | | | |
|---|---|---|---|---|
| 4,353,284 A * | 10/1982 | Billottet | ................... | F41H 7/02 89/40.03 |
| 5,114,094 A * | 5/1992 | Harris | ................... | F42B 10/661 244/3.22 |
| 6,536,553 B1 * | 3/2003 | Scanlon | ............... | G01N 29/069 181/108 |
| 8,950,309 B1 * | 2/2015 | Calvert | ................. | F42B 23/005 89/7 |
| 2004/0008890 A1 * | 1/2004 | Clark | ....................... | G06K 9/48 382/197 |

(Continued)

FOREIGN PATENT DOCUMENTS

KR 20080037434 A * 4/2008

OTHER PUBLICATIONS

Print Thread: RC-XD's are the Noob Tubes—p. 1: 4 pages: available online @ https://www.neoseeker.com/forums/49901/t1601030-rc-xds-new-noob-tubes/: last accessed Sep. 5, 2021 (Year: 2010).*

(Continued)

*Primary Examiner* — Hunter B Lonsberry
*Assistant Examiner* — Daniel L Greene
(74) *Attorney, Agent, or Firm* — Felix L. Fischer

(57) ABSTRACT

An anti-personnel autonomous vehicle (AGAR) system has a chassis formed by a directional fragmentation weapon (DFW). An unmanned aerial vehicle (UAV) assembly is engaged to the DFW, the UAV assembly having a plurality of wheel and motor units positioned to provide balanced wheel and motor on the DFW. A control module integrated in the UAV assembly has a wireless transmitter/receiver communicating with a remote controller.

20 Claims, 11 Drawing Sheets

(56) References Cited

U.S. PATENT DOCUMENTS

| | | | |
|---|---|---|---|
| 2012/0173045 A1* | 7/2012 | Conroy | F41H 5/06 |
| | | | 701/2 |
| 2014/0136414 A1* | 5/2014 | Abhyanker | G06Q 10/087 |
| | | | 705/44 |
| 2014/0180914 A1* | 6/2014 | Abhyanker | G05D 1/102 |
| | | | 705/39 |
| 2015/0005988 A1* | 1/2015 | Cox | B60L 15/20 |
| | | | 701/3 |
| 2016/0209185 A1* | 7/2016 | Ford | G05D 1/0038 |
| 2018/0107211 A1* | 4/2018 | Schubert | B64C 39/024 |
| 2018/0186454 A1* | 7/2018 | Luckay | G05D 1/0094 |
| 2018/0244383 A1* | 8/2018 | Valente | B64C 39/10 |
| 2019/0137219 A1* | 5/2019 | Bockmon | F41G 3/165 |
| 2019/0233102 A1* | 8/2019 | Kaneichi | B64C 39/024 |
| 2019/0235508 A1* | 8/2019 | Cantrell | G05D 1/0278 |
| 2019/0236538 A1* | 8/2019 | Kaneko | G06Q 10/0832 |
| 2020/0126676 A1* | 4/2020 | Willner | G06F 16/13 |

OTHER PUBLICATIONS

Call of Duty noir Ops RC XD—Photos: 1 page: available online @ https://www.gettyimages.fr/detail/photo/call-of-duty-black-ops-rc-xd-image-libre-de-droits/458445785: last accessed Sep. 5, 2021 (Year: 2011).*

Jakks Pacific 28692R RC-XD Video Surveillance Vehicle User Manual 28692 Rumble RC Car IS US R1: 3 pages: available online @ https://usermanual.wiki/Jakks-Pacific/28692R: last accessed Sep. 5, 2021 (Year: 2011).*

* cited by examiner

AUTONOMOUS GROUND ATTACK SYSTEM

REFERENCE TO RELATED APPLICATIONS

This application is copending with application Ser. No. 16/039,095 filed on Jul. 18, 2018 entitled ANTI-PERSONNEL AUTONOMOUS VEHICLE having a common assignee with the present application.

BACKGROUND INFORMATION

Field

Implementations of the disclosure relate generally to the field of anti-personnel explosive devices and more particularly a system for autonomous wheeled delivery of a directional fragmentation weapon.

Background

Directional fragmentation weapons such as the M18 Claymore Antipersonnel Mine are employed for defense of manned positions or personnel. Such weapons are typically stationary and are limited to engagement of an enemy at close range. The directional capability of the weapons is highly desirable and the basic weapon is readily available in arsenal inventory.

SUMMARY

Implementations disclosed herein provide a system for autonomous ground attack having a vehicle chassis formed by a directional fragmentation weapon (DFW). A motorized wheeled assembly is engaged to the DFW to create an autonomous unmanned wheeled vehicle. The motorized wheeled assembly employs a plurality of wheels and motors positioned to provide traction and steering on the DFW for the AGAR. A control module integrated into the motorized wheeled assembly has a wireless transmitter/receiver communicating with a remote controller.

The implementations disclosed provide a method for enemy engagement with an AGAR wherein a directed fragmentation weapon (DFW) is retrieved and an UAV assembly is mounted to the DFW. A control module communicates with a remote controller through a wireless transmitter/receiver.

BRIEF DESCRIPTION OF THE DRAWINGS

The features, functions, and advantages of the anti-personnel autonomous vehicle can be achieved independently in various implementations of the present disclosure or may be combined in yet other implementations further details of which can be seen with reference to the following description and drawings.

DETAILED DESCRIPTION

Implementations disclosed herein provide an autonomous unmanned wheeled vehicle that integrates a directional fragmentation weapon (DFW) such as an M18 Claymore mine into an expendable vehicle or "Autonomous Ground Attack Raider" (AGAR) to increase the precision firepower of tactical sized military units. The AGAR enables inexpensive engagement of ground targets at near and medium ranges up to 6 km, with an extended endurance depending on reduced power loiter. The AGAR incorporates the rigid structure of the DFW as a chassis. A motorized wheeled assembly having a plurality of wheels and associated drive motors is engaged to the DFW with a webbing strap securing system having specified lengths and connection locations to accurately self-position on the DFW. A targeting and navigation camera, wireless communications capability and a remote detonator are incorporated in the AGAR for operation by a remote controller. The AGAR provides independent terrain traversing capability to the existing DFW munition with the capability to forward deploy into militarily denied environments. The AGAR allows target acquisition and is remotely detonated by the AGAR operator.

Figure 1:
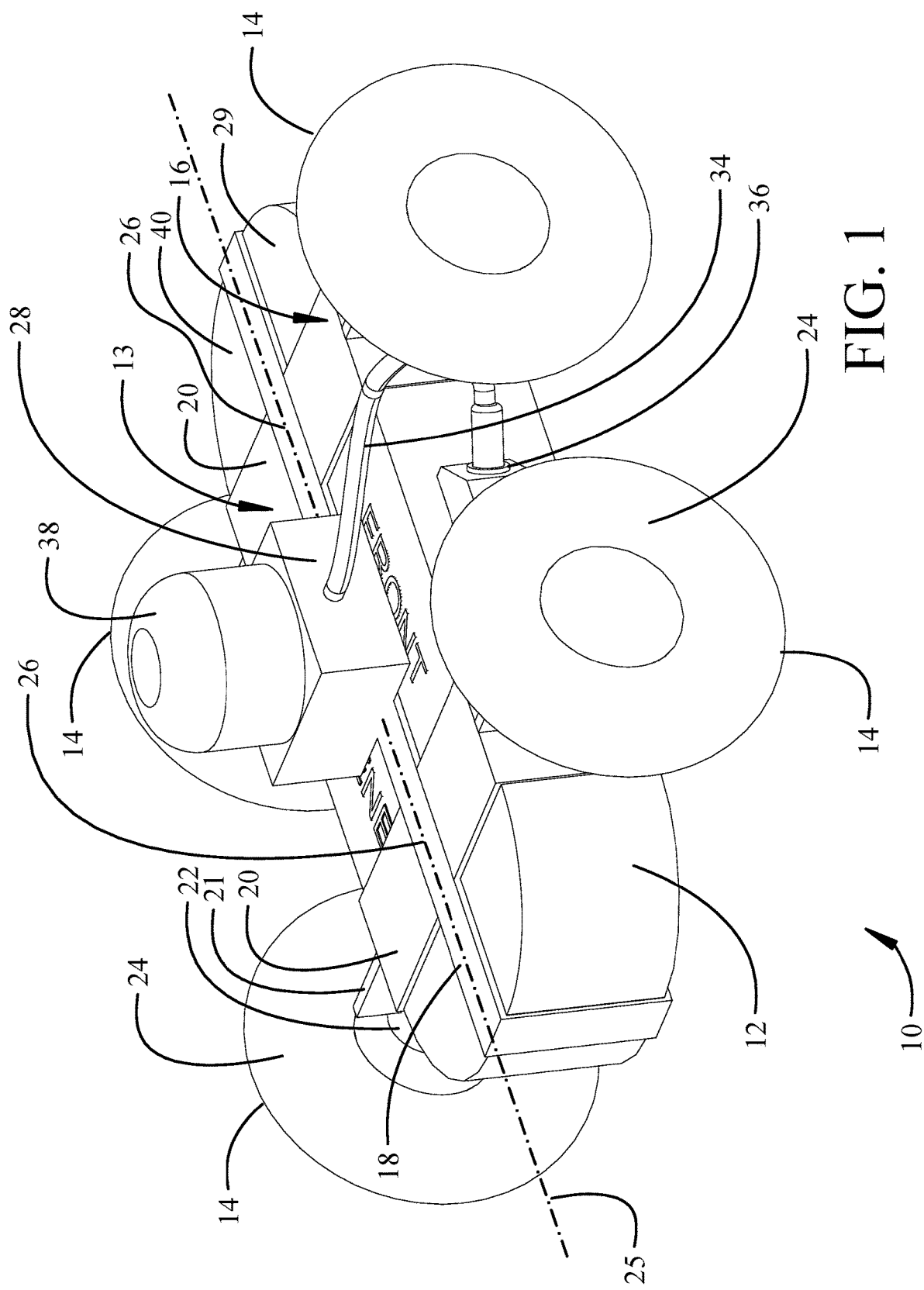
FIG. 1 is an upper view pictorial representation of an anti-personnel autonomous ground attack system implementation.
Figure 2:
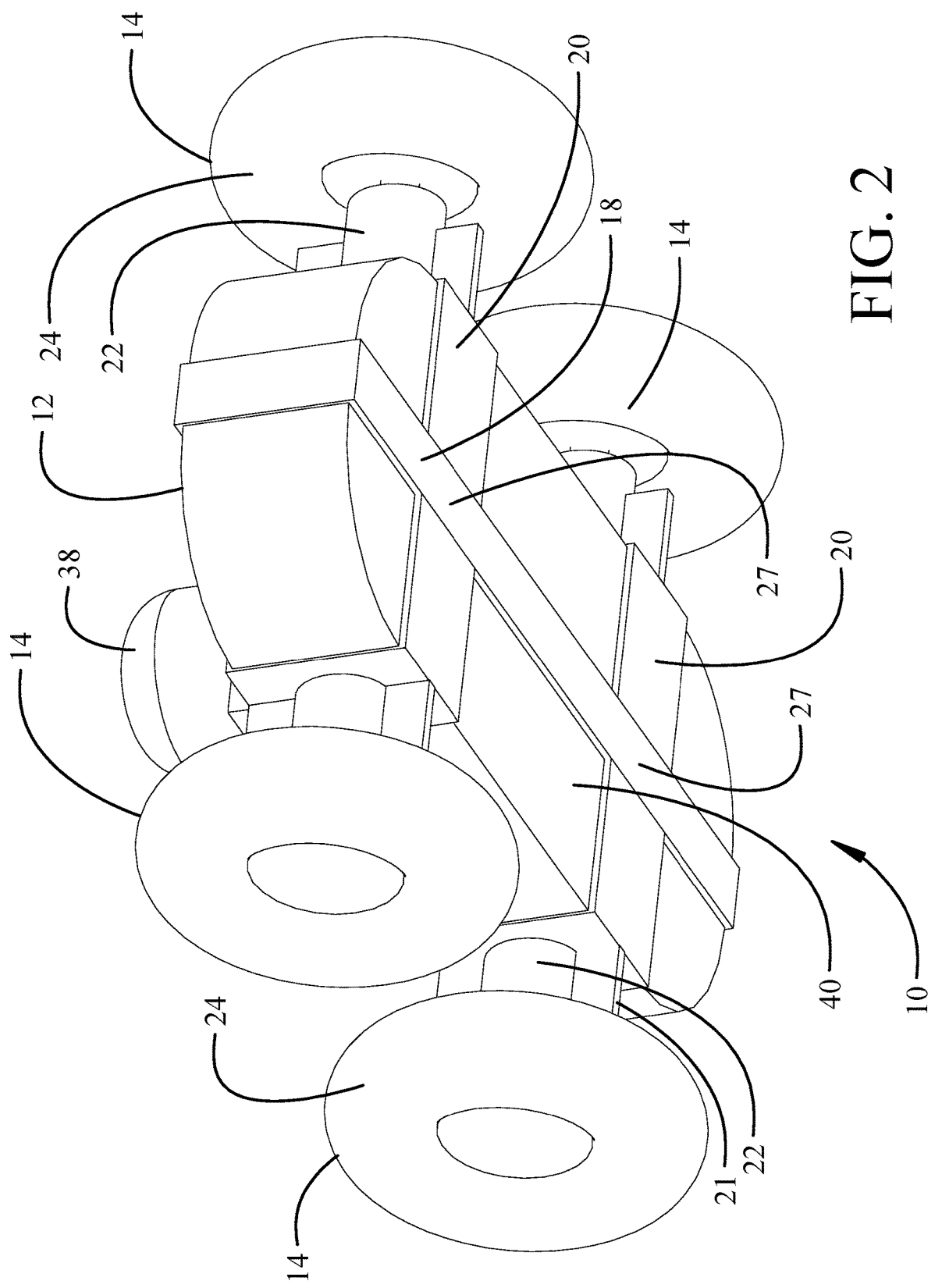
FIG. 2 is a lower view pictorial representation of the implementation of FIG. 1.
Figure 3:
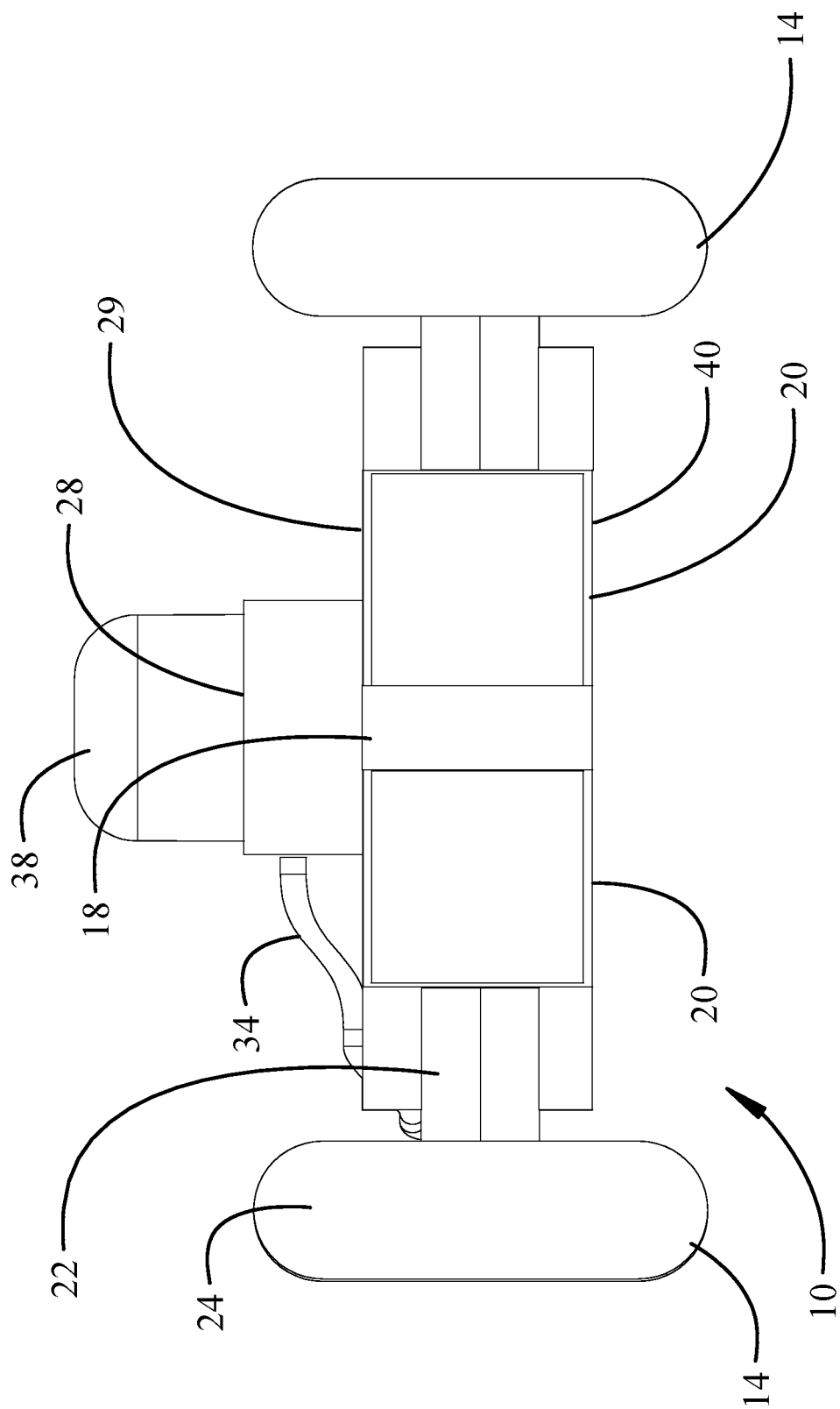
FIG. 3 is an end view of the implementation.
Figure 4:
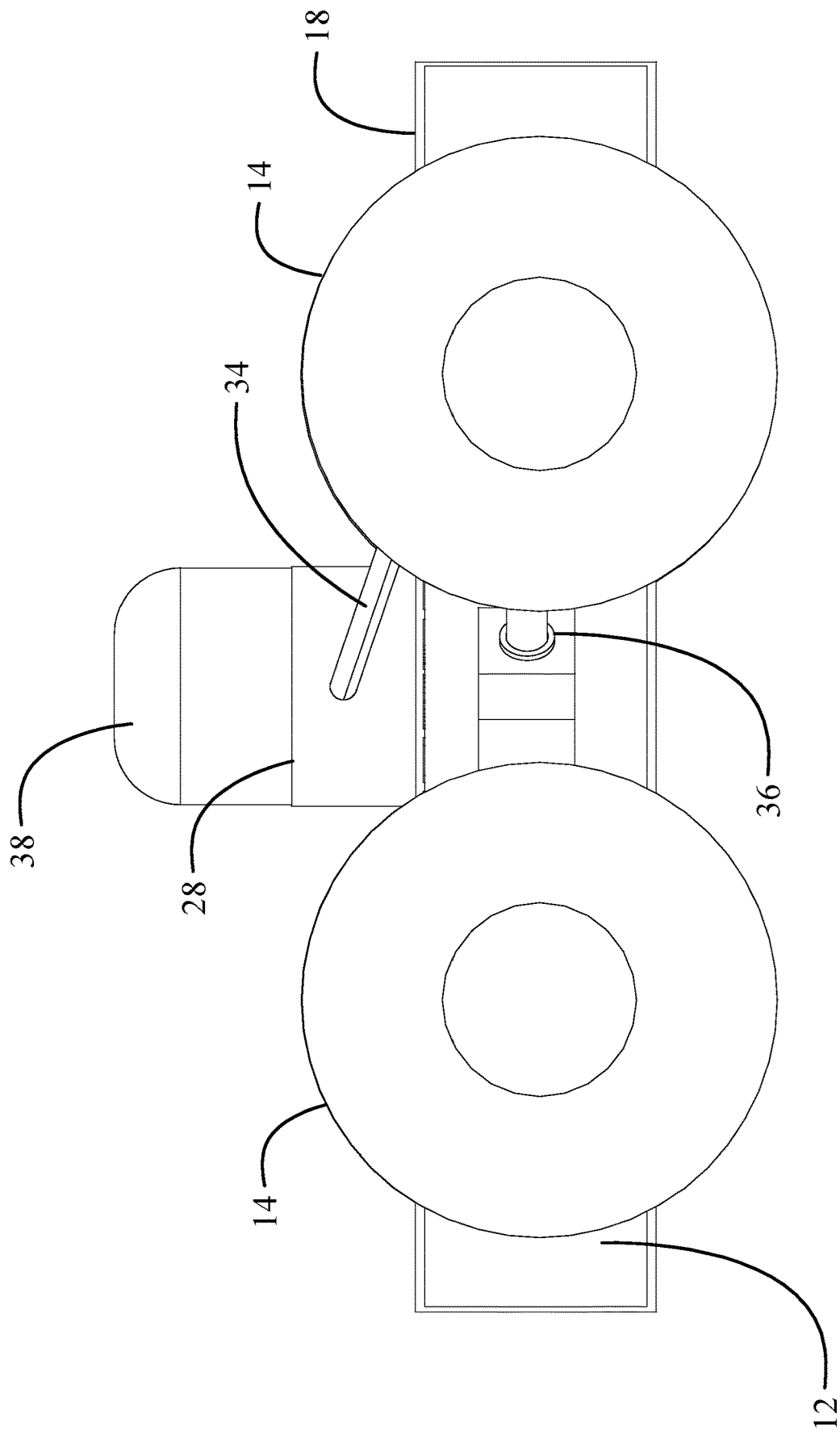
FIG. 4 is a side view of the implementation.
Figure 5:
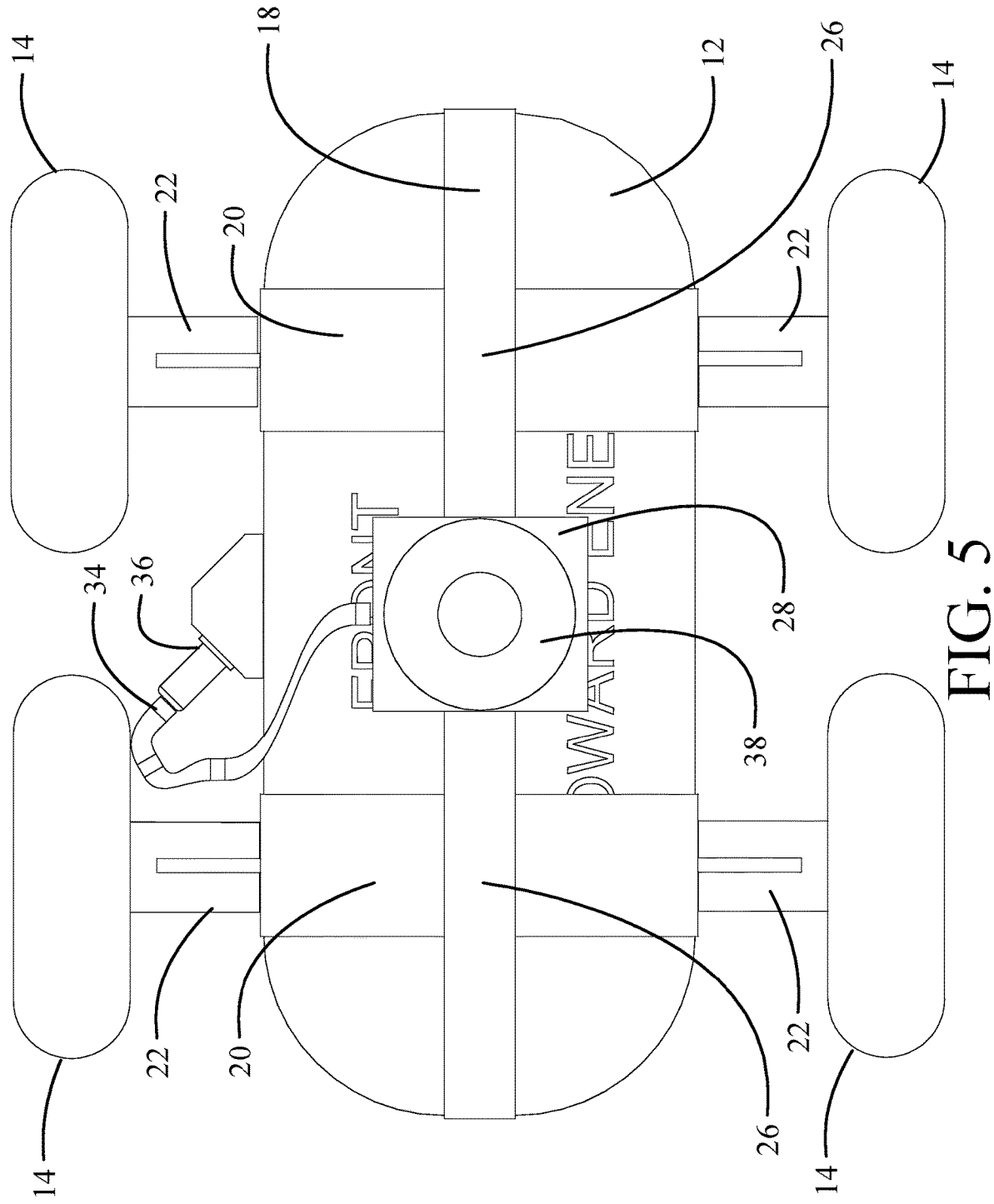
FIG. 5 is a top view of the implementation.
Figure 6:
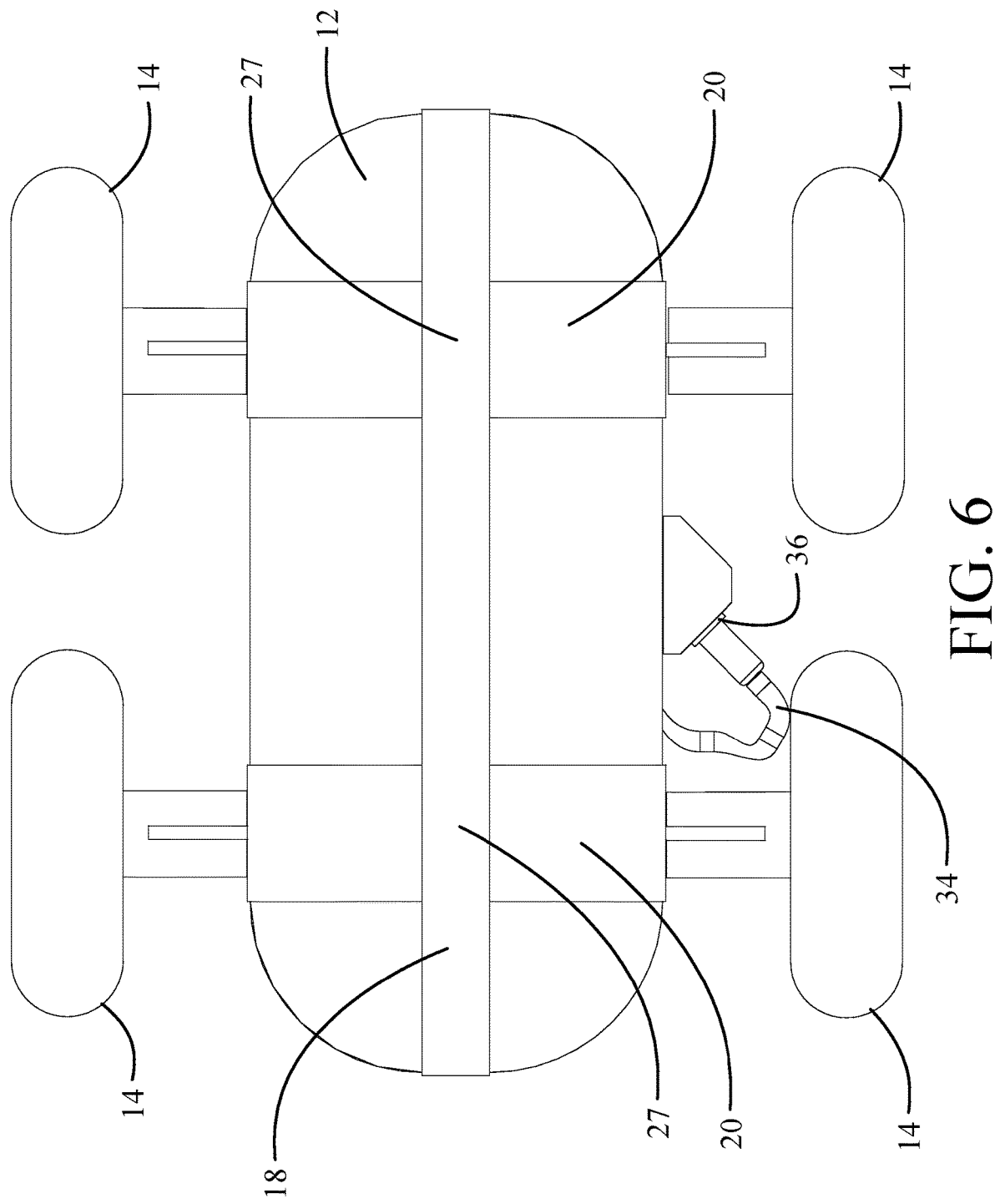
FIG. 6 is a bottom view of the implementation.

Referring to the drawings, FIGS. 1 and 2 show a general arrangement for an exemplary implementation of the AGAR 10. DFW 12 is employed as a chassis structure for a motorized wheeled assembly 13 having a plurality of wheel and motor units 14 (four for the implementation shown) that are connected to a harness 16 employing at least one longitudinal strap 18 and at least two lateral straps 20 adapted to be engaged around the DFW 12. The wheel and motor units 14 each incorporate an electric motor 22 and a wheel 24. The longitudinal strap 18 is sized to be received on the DFW 12 proximate a longitudinal midline 25 with close tolerance and the lateral straps 20 are fixed to the longitudinal strap 18 at connection points 26, 27. For the implementation as shown in the drawings, the two lateral straps 20 extend to engage the wheel and motor units 14 in a quadrilateral configuration and the connection points 26, 27 are spaced longitudinally to provide clearance of the wheels 24 in the wheel and motor units. Relative positioning of the connection points 26, 27 fixing the longitudinal strap 18 and the lateral straps 20 provides balanced positioning of the wheel and motor units 14 on the DFW 12. In exemplary implementations the longitudinal strap 18 and the lateral straps 20 may be Nylon® or plastic and may be connected with hook and loop fasteners or buckles to achieve a close tolerance fit on the DFW 12. Lateral straps 20 may be semi-rigid or reinforced, such as with ribs 21, to provide structural support rigidly fixing the wheel and motor units 14 in a horizontal orientation relative to the DFW 12.

As best seen in FIGS. 1 and 3-5, a control module 28 is affixed to the longitudinal strap at a central position intermediate the connection points 26 on an operational surface 40 of the DFW 12. The control module 28, shown in schematic block diagram form in FIG. 9, incorporates a microprocessor 30 or other dedicated computational system for navigation and control of the AGAR 10 with electrical connections to the wheel and motor units 14 for power control of the motors 22. Wiring for interconnection of the control module 28 and wheel and motor units 14 may be integral in the construction of the longitudinal and lateral straps. A wireless transmitter/receiver 32 is included in the control module and interconnected to the microprocessor for communication with a remote controller 33, as will be described in greater detail subsequently with respect to FIG. 8. A detonator connector 34 interconnects the control module 28 with the detonator input receptacle 36 on the DFW 12.

A targeting and navigation camera 38 seen in FIGS. 1-6 is affixed to the longitudinal strap at a central position intermediate connection points 27 on the operational surface 40 of the DFW 12. The operational surface 40 of the DFW 12 designates the operational direction of the DFW blast and is typically marked "Front Toward Enemy". In the implementation of FIGS. 1-6 the operational surface is pointed upward as an upper surface. The targeting and navigation camera 38 provides 360° observation capability below the AGAR 10 and is connected to the control module 28 for transmission of images through the wireless transmitter/receiver 32 to the remote controller 33.

Figure 7:
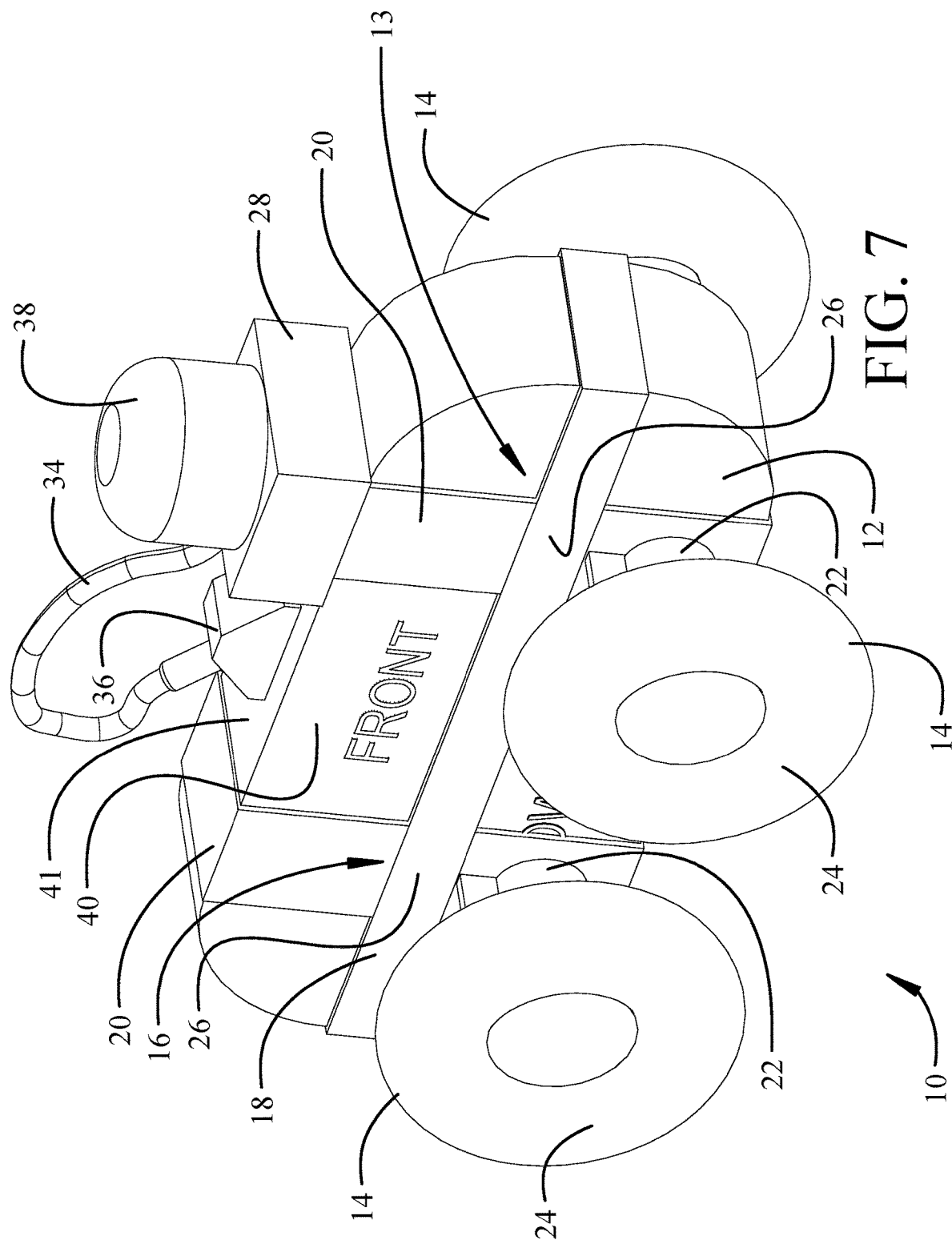
FIG. 7 is an upper view pictorial representation of a second implementation of the autonomous ground attack system.
Figure 8:
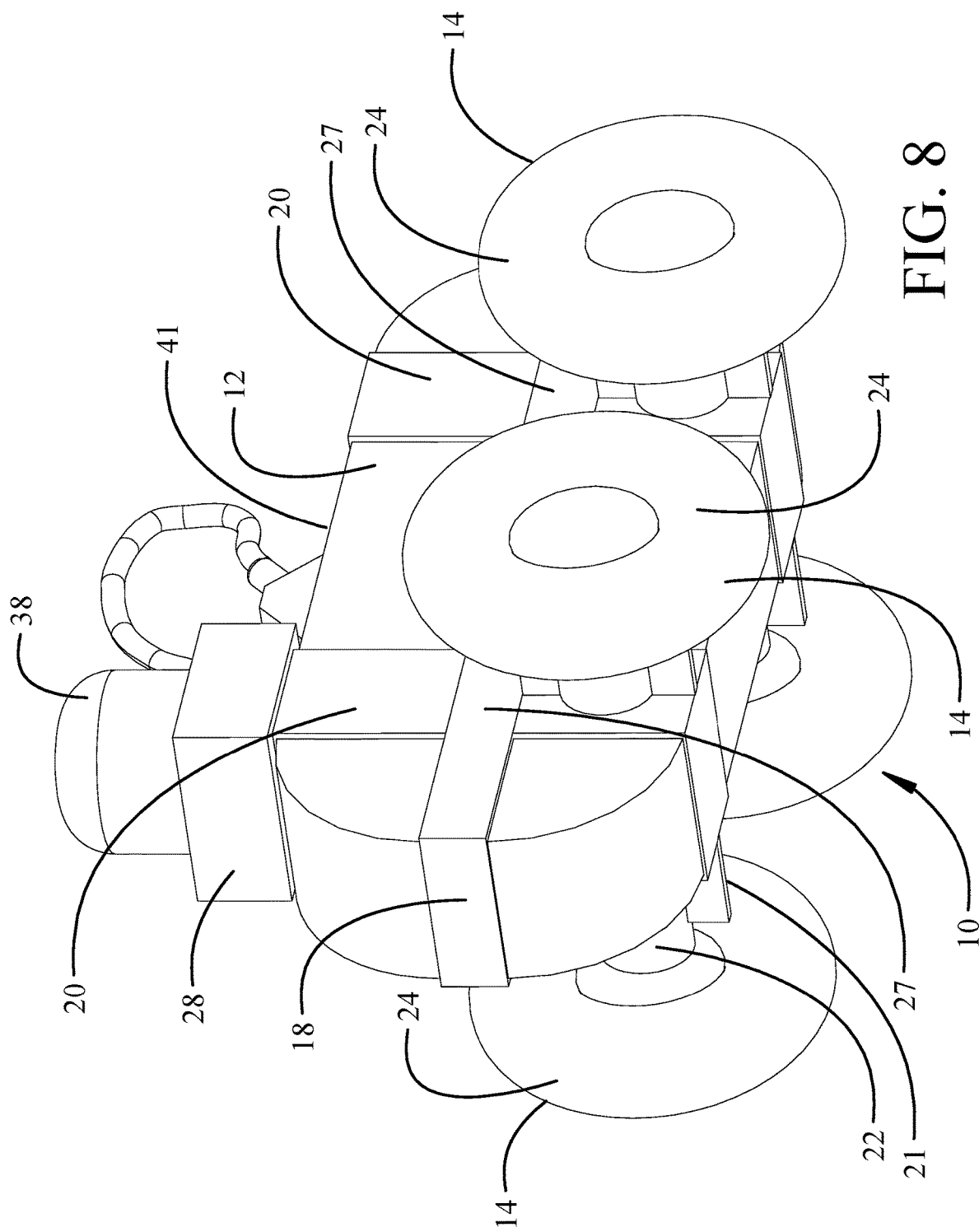
FIG. 8 is a lower view pictorial representation of the second implementation of FIG. 7.

The implementation shown in FIGS. 1-6 points the operational surface of the DFW 12 upward providing a hemispherical blast pattern. However, a lateral or "forward" blast pattern for the DFW 12 may be desirable. FIGS. 7 and 8 demonstrate an alternative implementation of the AGAR 10 to accomplish this effect. The motorized wheeled assembly 13 incorporates all elements as previously described however the control module 28 is now mounted on one of the lateral straps 20 on a side of the DFW 12 which is now oriented as an upper surface 41 of the DFW 12. In certain configurations of the alternative implementation, wheels 24 have sufficient diameter to allow mounting of the wheel and motor units 14 to the longitudinal strap 18 and the lateral straps 20 may be eliminated. Control module 28 and targeting and navigation camera 38 may be magnetically mounted to the upper surface 41 with separate wired connection to the wheel and motor units 14.

Figure 9:
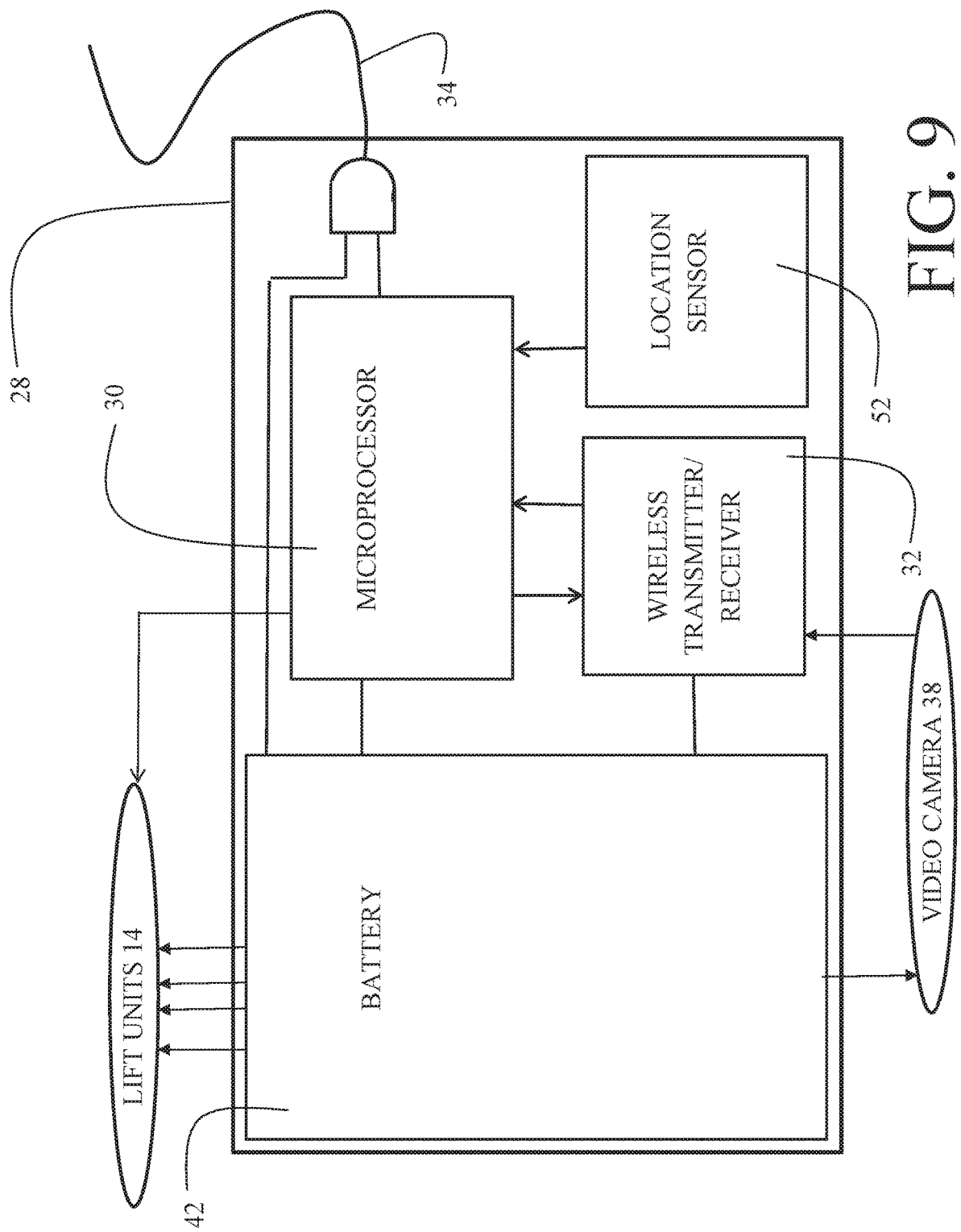
FIG. 9 is a block diagram of the control module.

A power source such as battery 42, seen in FIG. 9, or other energy system such as a miniature fuel cell, is provided in the control module 28 for providing power to the microprocessor 30, wireless transmitter/receiver 32, targeting and navigation camera 38, detonator connector 34 and motors 22 of the wheel and motor units 14.

The integrated harness 16 employing longitudinal strap 18 and lateral straps 20 with the fixed connection points 26, 27 allows rapid attachment of the motorized wheeled assembly 13 onto a standard DFW 12 with predetermined positioning for center of gravity of the overall AGAR 10 to provide appropriate weight and balance for operation. In alternative implementations, the wheel and motor units 14, control module 28 and targeting and navigation camera 38 may be separately secured to the DFW 12 with clamps or other devices, to eliminate one or more of the straps, using a template positioned or marked on the DFW12 providing the connection locations that would otherwise be automatically delivered by the integrated harness.

Figure 10:
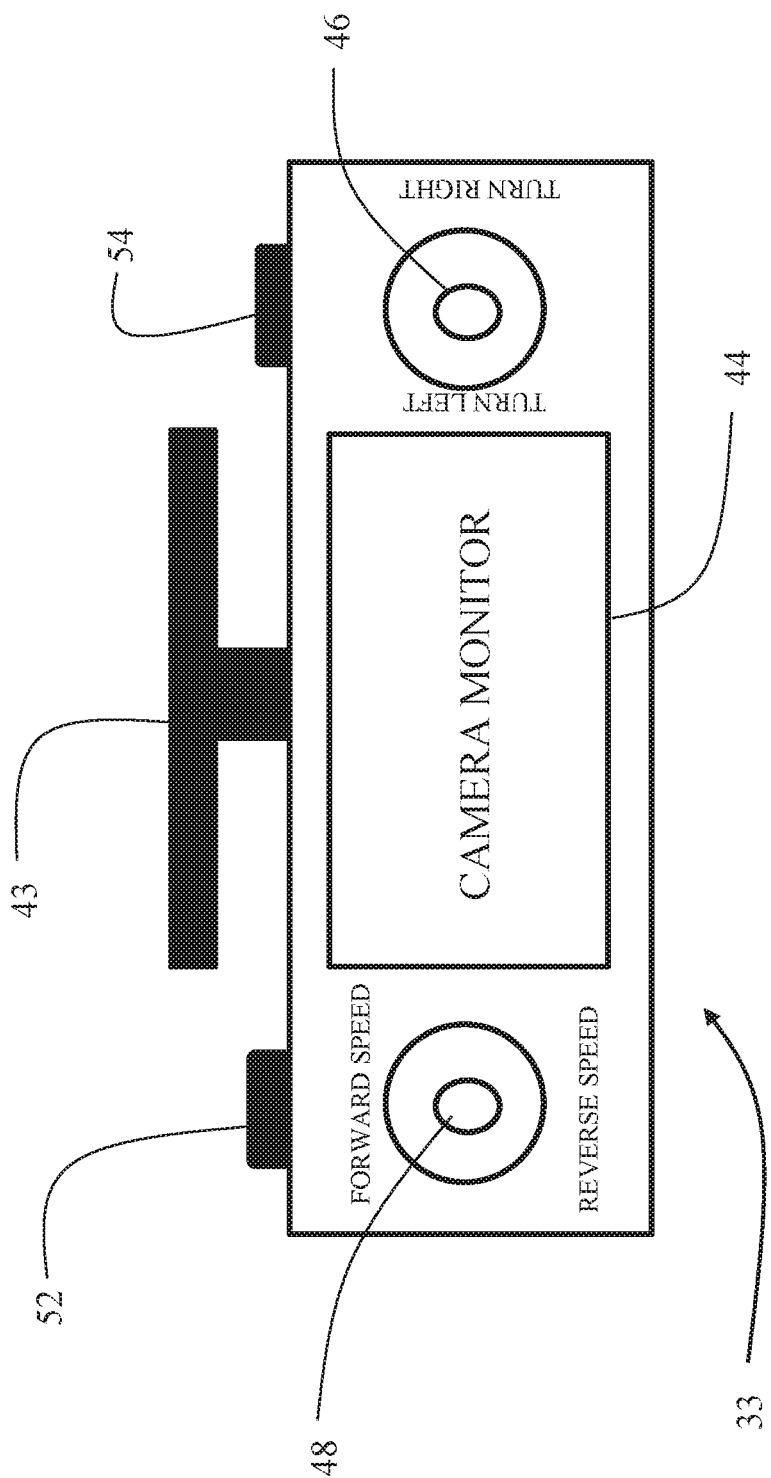
FIG. 10 is a representation of the remote controller.

A remote controller 33, seen in FIG. 10, communicates wirelessly with the AGAR 10 through an antenna 43 the wireless transmitter/receiver 32 to provide an operational AGAR system. A camera monitor 44 provides visual position and target information from the images provided by the targeting and navigation camera 38 on the AGAR 10. An exemplary control arrangement having a right joy stick 46 providing steering command inputs to the microprocessor 30 for transmission to the wheel and motor units 14. A left joy stick 48 provides forward and reverse speed command inputs to the microprocessor 30 for transmission to the wheel and motor units 14. Steering may be accomplished by differential speed inputs to the left and right wheel and motor units 14. In an alternative control arrangement, the right joy stick 46 may control forward and reverse speed inputs to the right side wheel and motor units and the left joy stick 48 may control forward and reverse speed inputs to the right side wheel and motor units to mutually accomplish forward and reverse speeds and steering. The control module 28 may additionally include a location sensor 50 such as Global Positioning System (GPS) receiver providing location and velocity of the AGAR 10 and autopilot controls such as a cruise control unit 52 for sustained speed may be employed on the remote controller 33 with effective control of the AGAR through the microprocessor 30. A detonator trigger 54 is provided on the remote controller 33 to allow an operator viewing a target on the camera monitor to detonate the DFW 12. Actuation of the detonator trigger 54 transmits a detonate instruction through the wireless transmitter/receiver 32 to the microprocessor 30 which issues a detonate command through the detonator connector 34 to the DFW 12.

Figure 11:
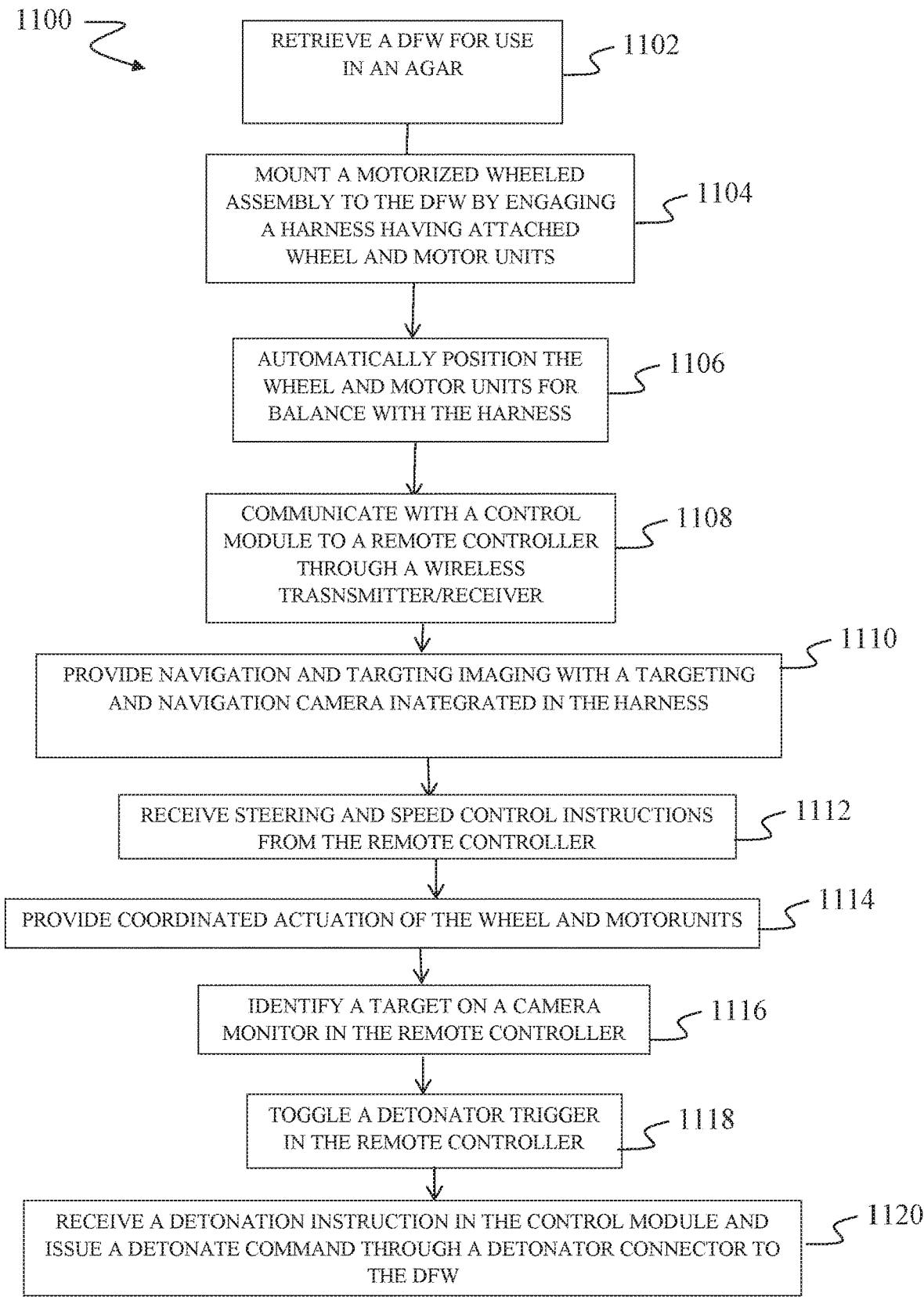
FIG. 11 is a flow chart of a method for engagement of an enemy with an anti-personnel autonomous vehicle of the disclosed implementation.

The disclosed implementations allow a method 1100 for enemy engagement with an AGAR 10 as shown in FIG. 11. A DFW 12 is retrieved, step 1102, and a motorized wheeled assembly 13 is mounted to the DFW by engagement of a harness 16 having attached wheel and motor units 14, step 1104. The harness automatically positions the wheel and motor units for proper weight and balance of the AGAR 10, step 1106. A control module 28 communicates with a remote controller 33 through a wireless transmitter/receiver 32, step 1108, providing navigation and targeting imaging with a targeting and navigation camera 38 integrated in the harness 16, step 1110, and receiving steering and speed control instructions from the remote controller 33, step 1112, to provide coordinated actuation of the wheel and motor units 14, step 1114. Upon identifying a target image on a camera monitor 44 in the remote controller 33, step 1116, an operator toggles a detonator trigger 54, step 1118. A resulting detonation instruction is received by the control module and a detonate command issued through a detonator connector 34 to detonate the DFW 12, step 1120.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:
1. An autonomous ground attack system comprising:
a directional fragmentation weapon (DFW);
a motorized wheeled assembly having a plurality of wheel and motor units, said motorized wheeled assembly configured to be attached to the DFW at a predetermined position, said DFW constituting a structural chassis, whereby said plurality of wheel and motor units position a center of gravity with the DFW for operational weight and balance;
a control module integrated in the motorized wheeled assembly having a wireless transmitter/receiver communicating with a remote controller.
2. The autonomous ground attack system as defined in claim 1 wherein the motorized wheeled assembly comprises a harness employing at least one longitudinal strap and at least two lateral straps adapted to be engaged around the DFW.

3. The autonomous ground attack system as defined in claim 2 wherein the at least one longitudinal strap is positioned in the harness proximate a midline of the DFW.

4. The autonomous ground attack system as defined in claim 3 where in the at least two lateral straps are fixed to the at least one longitudinal strap at connection points on an upper surface and a bottom surface of the DFW.

5. The autonomous ground attack system as defined in claim 4 wherein the plurality of wheel and motor units comprises four wheel and motor units and at least two lateral straps comprise two lateral straps that engage the wheel and motor units in a quadrilateral configuration and the connection points are spaced longitudinally to provide clearance of wheels in the wheel and motor units.

6. The autonomous ground attack system as defined in claim 5 wherein relative positioning of the connection points fixing the longitudinal strap and the lateral straps provides the balanced positioning of the wheel and motor units on the DFW.

7. The autonomous ground attack system as defined in claim 2 wherein the control module is engaged to one of the at least one longitudinal strap or a least two lateral straps at a central position on an upper surface of the DFW.

8. The autonomous ground attack system as defined in claim 7 wherein the wheel and motor units have motors and wheels and the control module comprises:
   a microprocessor for navigation and control with electrical connections to the wheel and motor units for power control of the motors.

9. The autonomous ground attack system as defined in claim 8 wherein the control module further comprises a wireless transmitter/receiver interconnected to the microprocessor for communication with the remote controller.

10. The autonomous ground attack system as defined in claim 9 wherein the control module further comprises a detonator connector interconnecting the control module with a detonator input receptacle on the DFW.

11. The autonomous ground attack system as defined in claim 2 further comprising a targeting and navigation camera affixed to the at least one longitudinal strap on an upper surface of the DFW.

12. The autonomous ground attack system as defined in claim 11 wherein the control module comprises:
   a microprocessor;
   a wireless transmitter/receiver interconnected to the microprocessor for communication with the remote controller, and,
   the targeting and navigation camera is connected to the microprocessor whereby images from the targeting and navigation camera are transmitted to the remote controller.

13. The autonomous ground attack system as defined in claim 10 wherein the control module further comprises a power source connected to provide power to the microprocessor, wireless transmitter/receiver, detonator connector and motors of the wheel and motor units.

14. The autonomous ground attack system as defined in claim 12 wherein the control module further comprises a power source connected to provide power to targeting and navigation camera.

15. An autonomous ground attack vehicle comprising:
   a directional fragmentation weapon (DFW);
   a motorized wheeled assembly having
      a harness employing a longitudinal strap and two lateral straps adapted to be engaged around the DFW at a predetermined position, said DFW constituting a structural chassis;
      four wheel and motor units having motors and wheels, said wheel and motor units connected to the lateral straps, said lateral straps fixed to the longitudinal strap at connection points positioned to provide a center of gravity of the wheel and motor units and the DFW providing operational weight and balance and clearance of the wheels;
   a control module integrated in the motorized wheel assembly, said control module having
      a wireless transmitter/receiver;
      a microprocessor connected to the wireless transmitter/receiver for navigation and control with electrical connections to the wheel and motor units for power control of the motors;
      a detonator connector interconnecting the control module with a detonator input receptacle on the DFW;
   a targeting and navigation camera affixed to the longitudinal strap at a central position intermediate the connection points on an upper surface of the DFW, the targeting and navigation camera connected to the microprocessor whereby images from the targeting and navigation camera are transmitted through the wireless transmitter/receiver; and
   a battery incorporated in the control module and connected to provide power to the microprocessor, wireless transmitter/receiver, detonator connector and motors of the wheel and motor units.

16. A method for enemy engagement with an autonomous ground attack vehicle comprising:
   retrieving a directed fragmentation weapon (DFW);
   mounting a motorized wheeled assembly to the DFW at a predetermined position, said DFW constituting a structural chassis, whereby a plurality of wheel and motor units position a center of gravity with the DFW for operational weight and balance; and,
   communicating through a control module with a remote controller through a wireless transmitter/receiver.

17. The method as defined in claim 16 further wherein the step of mounting a motorized wheel assembly to the DFW comprises:
   engaging a harness having attached wheel and motor units;
   positioning the wheel and motor units automatically with the harness for proper weight and balance of the autonomous ground attack vehicle.

18. The method as defined in claim 17 further comprising:
   providing navigation and targeting imaging with a camera integrated in the harness; and
   receiving flight control instructions from the remote controller;
   providing coordinated actuation of the wheel and motor units through the control module responsive to the flight control instructions.

19. The method as defined in claim 18 further comprising:
   identifying a target image on a camera monitor in the remote controller; and
   toggling a detonator trigger.

20. The method as defined in claim 19 further comprising;
   receiving a resulting detonation instruction by the control module; and
   issuing a detonate command through a detonator connector to detonate the DFW.

* * * * *